US012234970B1

(12) United States Patent
Maa et al.

(10) Patent No.: US 12,234,970 B1
(45) Date of Patent: Feb. 25, 2025

(54) LAMPHOLDER SYSTEM WITH LOCK

(71) Applicant: Aleddra Inc., Renton, WA (US)

(72) Inventors: Chia-Yiu Maa, Bellevue, WA (US); Chun-Te Yu, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 18/735,177

(22) Filed: Jun. 6, 2024

(51) Int. Cl.
*F21V 19/04* (2006.01)
*F21V 19/00* (2006.01)
*H01J 9/00* (2006.01)

(52) U.S. Cl.
CPC .......... *F21V 19/04* (2013.01); *F21V 19/0005* (2013.01); *F21V 19/008* (2013.01); *H01J 9/003* (2013.01)

(58) Field of Classification Search
CPC .... F21V 19/04; F21V 19/0005; F21V 19/008; F21V 19/003
See application file for complete search history.

(56) References Cited

U.S. PATENT DOCUMENTS

2010/0015843 A1* 1/2010 Zayas ................ H01R 33/0854 439/375

* cited by examiner

*Primary Examiner* — Anne M Hines
(74) *Attorney, Agent, or Firm* — Andy M. Han; Han IP PLLC

(57) ABSTRACT

A lampholder system comprises a lampholder having a center section for holding bi-pins on an endcap of a linear tubular lamp, a securing mechanism and a locking mechanism. The center section has a securing mechanism for securing the bi-pins on the endcap of the linear tubular lamp in the center section. The locking mechanism, when applied to the lampholder, prevents the bi-pins on the endcap of the linear tubular lamp from being removed out of the lampholder, consequently preventing the linear tubular lamp from being removed out of the lampholder.

12 Claims, 2 Drawing Sheets

LAMPHOLDER SYSTEM WITH LOCK

BACKGROUND

Technical Field

The present disclosure pertains to the field of lampholder and, more specifically, proposes lampholder system with lock used for linear tubular lamp.

Description of Related Art

Recently a new type of linear tubular lamp with bi-pins has been developed with an internal battery, thus making it a dual-function lamp. During normal operation, such linear tubular lamp operates as a regular lamp. During power outage, it draws power from its internal battery and thus becomes emergency lighting equipment. Such linear tubular lamp is classified as emergency tubular lamp.

Lampholders are widely used for linear tubular lamps with bi-pins. A lampholder provides easy insertion and locking of the linear tubular lamps with bi-pins through a center section, without using any tool. An emergency tubular lamp can be used with any lampholder since from a mechanical perspective it is not different from a regular linear tubular lamp with bi-pins. However, it is a different story from a safety perspective.

The emergency lighting equipment standards, e.g., UL 924, stipulate that emergency lighting equipment is required to be affixed to the building. Using an emergency ballast as an example, in order to meet such a requirement, the emergency ballast is required to fasten to a fixture, which is affixed to the ceiling, which is a part of the building. The requirement on the emergency lighting equipment being affixed to the building is to prevent a non-electrician (e.g., a custodian) from accidentally removing an emergency ballast and replacing it with a regular ballast, thus effectively downgrading the emergency lighting equipment to a regular lighting equipment, resulting in a violation of the safety code.

The present disclosure proposes a lampholder system with lock. When used with an emergency tubular lamp, the lock of the lampholder system can only be removed with a tool, but not with bare hands, thus meeting the requirement on the emergency lighting equipment being affixed to the fixture and the building, without any mechanical modifications of the emergency tubular lamp. It is thus suitable for any emergency tubular lamps.

SUMMARY

In one aspect, a lampholder system comprises a lampholder having a center section for holding bi-pins on an endcap of a linear tubular lamp, and a locking mechanism. The lampholder has an opening on the top and the center section has a slot. The opening and the slot together support the sliding in of the bi-pins on the endcap of the linear tubular lamp through the opening and the slot. The center section has a securing mechanism for securing the bi-pins on the endcap of the linear tubular lamp in the center section. Moreover, the locking mechanism, when applied to the opening, or the center section, or both, or the entire lampholder, prevents the bi-pins on the endcap of the linear tubular lamp from being removed out of the lampholder, consequently preventing the linear tubular lamp from being removed out of the lampholder. After applying the locking mechanism to the lampholder, the bi-pins on the endcap of the linear tubular lamp may still be able to move or rotate in the lampholder, for the locking mechanism is not required to lock the bi-pins on the endcap of the linear tubular lamp from any movement. The requirement of the locking mechanism is that after applying the locking mechanism the bi-pins on the endcap of the linear tubular lamp cannot be removed from the lampholder, and consequently the linear tubular lamp cannot be removed from the lampholder.

The securing mechanism is not to be confused with the locking mechanism. The purpose of the securing mechanism is to ensure that the bi-pins on the endcap of the linear tubular lamp sit inside the lampholder securely after installation and during normal use. The securing mechanism doesn't prevent the lamp from being removed out of the lampholder. In contrast, the locking mechanism once applied ensures the lamp cannot be removed out of the lampholder.

In some embodiments, the securing mechanism is through a groove in the center section supporting the rotation of the bi-pins on the endcap of the linear tubular lamp in the groove by force clockwise and/or counterclockwise 90 degrees such that the bi-pins are locked by two electrical contacts (making contact with the bi-pins) inside the groove. The groove may be of a circular shape, though this is not required. There may be a cover covering partly the groove. The center section may comprise a rotary center, though this is not required.

In some other embodiments, the securing mechanism is through two parallel slots in the center section each receiving a pin of the bi-pins such that the bi-pins are locked by two electrical contacts (making contact with the bi-pins) inside the two slots.

In some embodiments, the locking mechanism is removable only with a tool and not removeable by bare hands. This technical feature is critical in meeting the requirement of emergency lighting equipment being affixed to a fixture or building.

In some embodiments, the locking mechanism is a plug plugging into either the opening, or the center section, or both, thus preventing the bi-pins on the endcap of the linear tubular lamp from being removed out of the lampholder, consequently preventing the linear tubular lamp from being removed out of the lampholder. Embodiments of the present disclosure in other form factors are foreseeable. For example, a magnetic lock that covers the center section and/or the entire lampholder may be another embodiment of the locking mechanism as long as it can effectively prevent the bi-pins on the endcap of the linear tubular lamp from being removed out of the lampholder. To reiterate, the linear tubular lamp may still be able to move or rotate in the lampholder after applying such magnetic lock, but it is not possible to remove bi-pins on the endcap of the linear tubular lamp. Additionally, such magnetic lock may only be removed with a proper magnetic key, thus meeting the technical feature of being removable only with a tool and not by bare hands.

In some embodiments, the center section has a means for receiving the plug. This suggests some modification may be needed for the center section of the lampholder to receive and retain the plug.

In some embodiments, the locking mechanism is a screw screwing into either the opening, or the center section, or both, thus preventing the bi-pins on the endcap of the linear tubular lamp from being removed out of the lampholder, consequently preventing the linear tubular lamp from being removed out of the lampholder.

In some embodiments, the center section has a means for receiving the screw. There may be a threaded hole in the center section of the lampholder to receive and retain the screw.

In another aspect, a lampholder system comprises a lampholder having a spring-loaded center section for holding a pin or bi-pins on an endcap of a linear tubular lamp and a locking mechanism. The spring-loaded lampholder is commonly used for linear tubular lamp with single-pin FA8 endcap. Some spring-loaded lampholder are designed to house G13 endcap with bi-pins. The spring-loaded center section houses the pin or bi-pins on an endcap of a linear tubular lamp. The spring-loaded center section contains a spring (or a mechanism functioning like a spring) supporting the installation and the removal of the linear tubular lamp by pushing the spring-loaded center section toward the base of the spring-loaded center section. The locking mechanism, when applied, prevents the spring-loaded center section from being pushed toward the base of the spring-loaded center section, and consequently prevents the linear tubular lamp from being removed out of the lampholder. It is to be noted that the spring-loaded center section (including the spring) is the securing mechanism of the spring-loaded lampholder for securing the bi-pins on the endcap of the linear tubular lamp in the spring-loaded center section.

In some embodiments, the locking mechanism is removable only with a tool and not removeable by bare hands. This technical feature is critical in meeting the requirement of emergency lighting equipment being affixed to a fixture or building.

In some embodiments, the locking mechanism is a screw screwing into the base of the spring-loaded lampholder with the effect of blocking the spring inside the spring-loaded center section from retraction, thus preventing the spring-loaded center section from being pushed toward the base of the spring-loaded center section. This consequently prevents the linear tubular lamp from being removed out of the lampholder.

In some embodiments, the locking mechanism is a clamp with sufficient thickness and width for fitting over the spring-loaded center section and between the base of the spring-loaded center section and the endcap of the linear tubular lamp, preventing the spring-loaded center section from being pushed toward the base of the spring-loaded center section. This consequently prevents the linear tubular lamp from being removed out of the lampholder. The width of the clamp is ideally equal to the width of the gap between the base of the base of the spring-loaded center section and the endcap of the linear tubular lamp after the lamp being installed to the lampholder, thus preventing any movement of the lamp toward the base of the spring-loaded center section. The clamp may be of round shape, O shape, U shape, V shape, or any similar shape that can fit over the spring-loaded center section which usually has a round shape.

BRIEF DESCRIPTION OF THE DRAWINGS

The accompanying drawings are included to aid further understanding of the present disclosure and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of lampholder systems having different form factors.

A lampholder system comprises a lampholder having a center section for holding bi-pins on an endcap of a linear tubular lamp, and a locking mechanism. The center section has a groove supporting the rotation of the bi-pins on the endcap of the linear tubular lamp in the groove by force clockwise and/or counterclockwise. The locking mechanism, when applied to the lampholder, prevents the bi-pins on the endcap of the linear tubular lamp from rotation in the center section.

Example Implementations

Figure 1A:
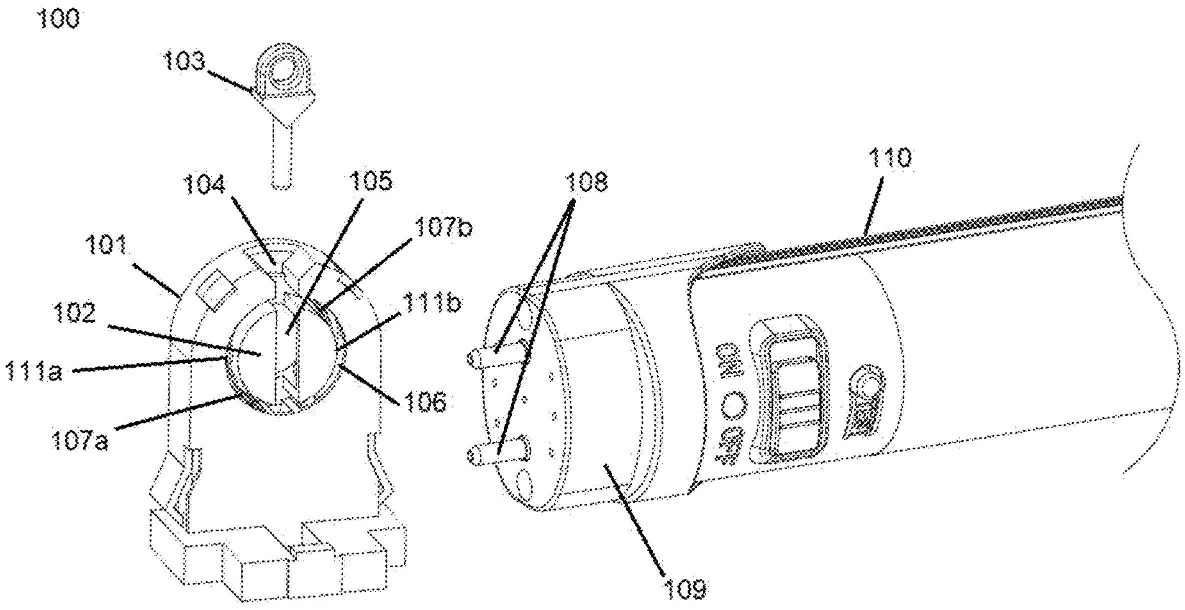
FIG. 1A schematically depicts an embodiment of the present disclosure with lampholder and a plug as a locking mechanism when the lampholder is in an unlocked position.
Figure 1B:
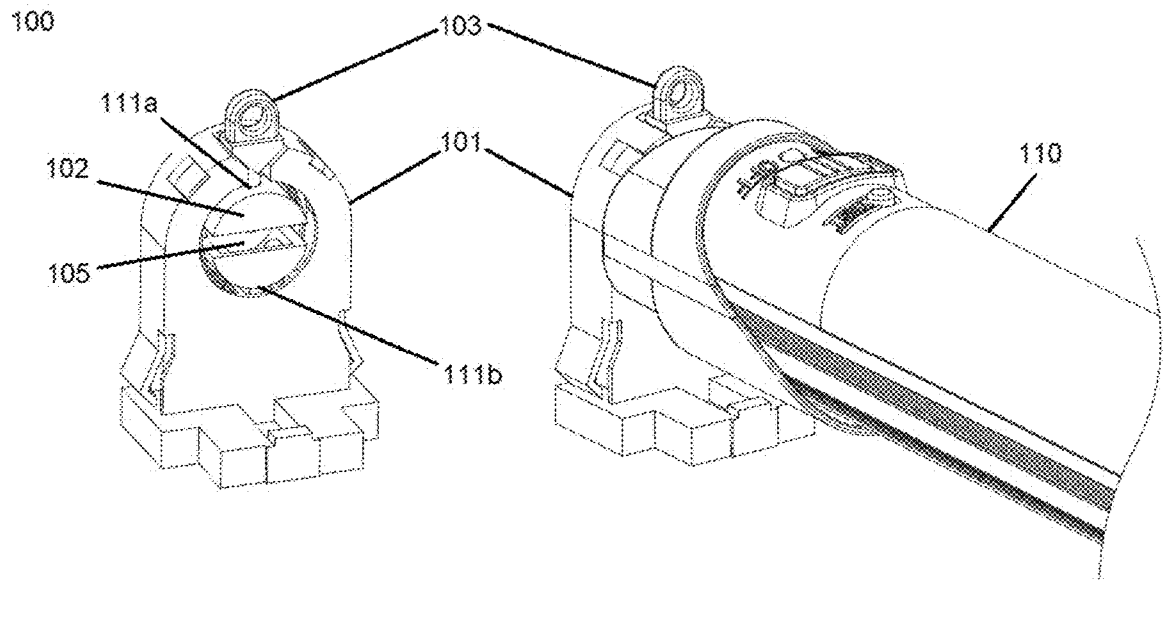
FIG. 1B schematically depicts the same embodiment of the present disclosure when the lampholder is in a locked position.

FIGS. 1A and 1B show an embodiment of the lampholder system of the present disclosure 100. It comprises lampholder 101 with a center section, and a plug 103. The center section comprises a slot 105, a circular groove 106, and a rotary center 102. The lampholder 101 has an opening on the top 104 and the center section has the slot 105. The opening 104 and the slot 105 together support the sliding in of the bi-pins 108 on the endcap 109 of an emergency tubular lamp 110 through the opening 104 and the slot 105. Circular groove 106 supporting the rotation of the bi-pins 108 on the endcap 109 of the emergency tubular lamp 110 in the groove by force clockwise and/or counterclockwise by 90 degrees. There are two electrical contacts 107*a* and 107*b* in the opposite side of the circular groove 106. Each electrical contact (107*a* or 107*b*) contacts one of the bi-pins 108 on the endcap 109 of the emergency tubular lamp 110. Moreover, the two electrical contacts 107*a* and 107*b* function as a securing mechanism in securing the bi-pins 108 in the center section during normal operation of the lamp 110. The locking mechanism in this embodiment is plug 103. After the emergency tubular lamp 110 is slid into the rotary center 102 through the opening 104 and the slot 105 and rotated 90 degrees, the plug 103 is inserted through the opening 104 and into the rotary center 102. The tip of plug 103 extrudes into hole 111*a* on rotary center 102 as shown in FIG. 1B. As a result, the rotary center 102 is locked from rotation, and the emergency tubular lamp 110 cannot be rotated or removed from the lampholder 101. Once plug 103 is inserted into the lampholder 101 through the opening 104 and into the hole 111*a* on the rotary center 102, the plug is not removeable by bare hands. It can only be removed with a tool such as a hook or a plier, thus meeting the requirement of emergency lighting equipment being affixed to a fixture. Note that the lampholder is already affixed to the fixture and becomes an integral part of the fixture, and the fixture is affixed to the ceiling/building.

In embodiment 100, plug 103 has a straight tip and the rotary center 102 has two holes 111*a*, 111*b* for receiving the tip of the plug 103. In another embodiment, the plug 103 may be replaced with a screw and the holes 111*a*, 111*b* may be changed to threaded holes for receiving the screw. With these modifications, the screw can only be installed and removed with a screwdriver, thus meeting the requirement of emergency lighting equipment being affixed to a fixture.

Figure 2A:
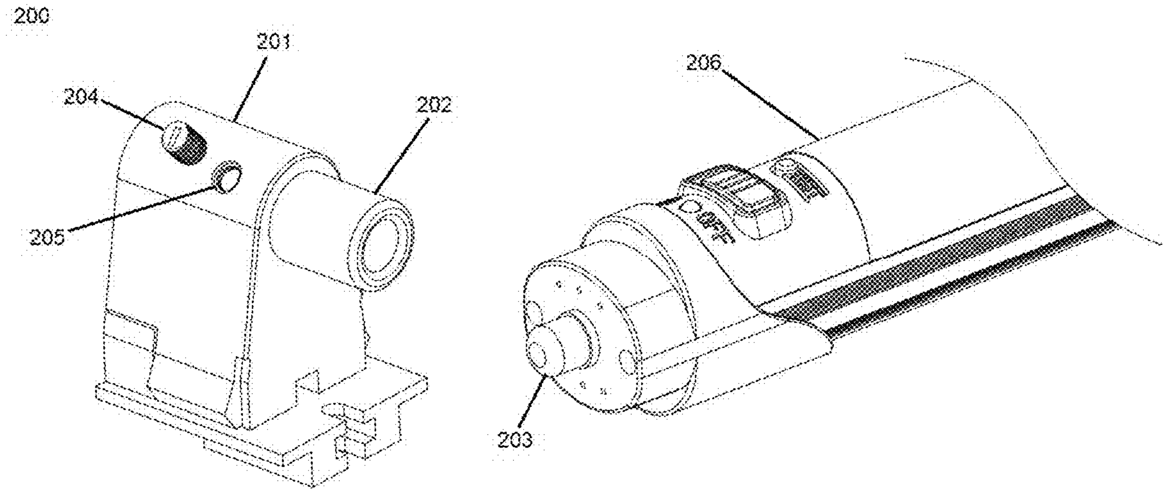
FIG. 2A schematically depicts an embodiment of the present disclosure with a lampholder having a spring-loaded center section and a screw as a locking mechanism when the lampholder in an unlocked position.
Figure 2B:
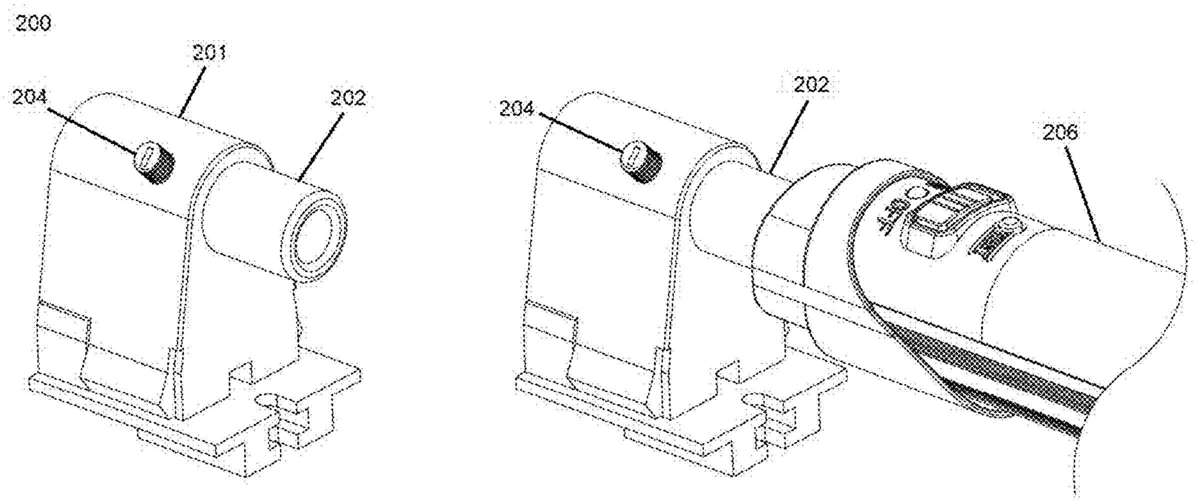
FIG. 2B schematically depicts the same embodiment of the present disclosure when the lampholder is in a locked position.

FIGS. 2A and 2B show an embodiment of the lampholder system of the present disclosure 200. It comprises lampholder 201 with a spring-loaded center section 202 and a screw 204. The spring-loaded center section 202 houses an FA8 bin 203 on an endcap of a linear tubular lamp 206. The spring-loaded center section 202 contains a spring (not shown) supporting the installation and the removal of the linear tubular lamp 206 by pushing the spring-loaded center section 202 toward the base of the spring-loaded center section. The locking mechanism in this embodiment is the screw 204, and there is a threaded hole 205 on the base of the spring-loaded center section 202 for receiving the screw 204. Once the screw 204 being screwed into the hole 205, the screw blocks the spring inside the spring-loaded center section 202 from retraction, thus preventing the spring-loaded center section from being pushed toward its base, and consequently preventing the lamp 206 from being removed out of the lampholder 201. Moreover, once the screw 204 being screwed into hole 205, the screw is not removeable by bare hands. It can only be removed with a screwdriver, thus meeting the requirement of emergency lighting equipment being affixed to a fixture.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A lampholder system, comprising:

a lampholder having a center section configured to hold bi-pins on an endcap of a linear tubular lamp;

a locking mechanism; and a linear lamp with two identical endcaps, wherein:

the lampholder has an opening on a top thereof and the center section has a slot, with the opening and the slot together supporting sliding in of the bi-pins on the endcap of the linear tubular lamp through the opening and the slot, the center section has a securing mechanism configured to secure the bi-pins on the endcap of the linear tubular lamp in the center section, the locking mechanism, when applied to the opening or the center section, or both, or the entire lamp holder, prevents the bi-pins on the endcap of the linear tubular lamp from being removed out of the lampholder, consequently preventing the linear tubular lamp from being removed out of the lampholder, and the two identical endcaps of the linear lamp have a form of a standard endcap with a flat end face and including only one cylindrical portion with one diameter.

2. The lampholder system of claim 1, wherein the securing mechanism, through a groove in the center section, supports a rotation of the bi-pins on the endcap of the linear tubular lamp in the groove by force clockwise or counterclockwise 90 degrees such that the bi-pins are locked by two electrical contacts making contact with the bi-pins inside the groove.

3. The lampholder system of claim 1, wherein the securing mechanism, through each of two parallel slots in the center section, receives a pin of the bi-pins such that the bi-pins are locked by two electrical contacts making contact with the bi-pins inside the two slots.

4. The lampholder system of claim 1, wherein the locking mechanism is removable only with a tool.

5. The lampholder system of claim 1, wherein the locking mechanism comprises a plug plugging into either the opening or the center section, or both, thus preventing the bi-pins on the endcap of the linear tubular lamp from being removed out of the lampholder, consequently preventing the linear tubular lamp from being removed out of the lampholder.

6. The lampholder system of claim 5, wherein the center section is configured to receive the plug.

7. The lampholder system of claim 1, wherein the locking mechanism comprises a screw screwing into either the opening or the center section, or both, thus preventing the bi-pins on the endcap of the linear tubular lamp from being removed out of the lampholder, consequently preventing the linear tubular lamp from being removed out of the lampholder.

8. The lampholder system of claim 7, wherein the center section is configured to receive the screw.

9. A lampholder system, comprising:

a lampholder having a spring-loaded center section configured to hold a pin or bi-pins on an endcap of a linear tubular lamp; and a locking mechanism, wherein:

the spring-loaded center section houses the pin or bi-pins on the endcap of the linear tubular lamp, the spring-loaded center section contains a spring or a mechanism functioning like a spring supporting installation and removal of the linear tubular lamp by pushing the spring-loaded center section toward a base of the spring-loaded center section, the locking mechanism, when applied, prevents the spring-loaded center section from being pushed toward the base of the spring-loaded center section, consequently preventing the linear tubular lamp from being removed out of the lampholder.

10. The lampholder system of claim 9, wherein the locking mechanism is removable only with a tool.

11. The lampholder system of claim 9, wherein the locking mechanism comprises a screw screwing into the base of the spring-loaded lampholder with an effect of blocking the spring inside the spring-loaded center section from retraction, thus preventing the spring-loaded center section from being pushed toward the base of the spring-loaded center section.

12. The lampholder system of claim 9, wherein the locking mechanism comprises a clamp with thickness and width configured to fit over the spring-loaded center section and between a base of the spring-loaded center section and the endcap of the linear tubular lamp, thereby preventing the spring-loaded center section from being pushed toward the base of the spring-loaded center section.

* * * * *